(12) United States Patent
Chun et al.

(10) Patent No.: US 8,108,449 B2
(45) Date of Patent: Jan. 31, 2012

(54) INFORMATION STORAGE MEDIUM FOR STORING METADATA SUPPORTING MULTIPLE LANGUAGES, AND SYSTEMS AND METHODS OF PROCESSING METADATA

(75) Inventors: Hye-jeong Chun, Yongin-si (KR); Jung-wan Ko, Suwon-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/967,319

(22) Filed: Dec. 31, 2007

(65) Prior Publication Data

US 2008/0109460 A1 May 8, 2008

Related U.S. Application Data

(62) Division of application No. 11/214,801, filed on Aug. 31, 2005.

(30) Foreign Application Priority Data

Sep. 15, 2004 (KR) .................... 10-2004-0073925
Nov. 11, 2004 (KR) .................... 10-2004-0091910

(51) Int. Cl.
*G06F 12/00* (2006.01)
*G06F 17/30* (2006.01)
(52) U.S. Cl. ...................... 707/822; 707/913
(58) Field of Classification Search .............. 707/3, 102, 707/103 R, 999.003, 999.102, 999.103, 793, 707/822, 913; 386/95, 96, 98, 125
See application file for complete search history.

(56) References Cited

U.S. PATENT DOCUMENTS

| | | | | | |
|---|---|---|---|---|---|
| 5,416,903 | A | * | 5/1995 | Malcolm | 715/703 |
| 5,548,509 | A | * | 8/1996 | Takagi | 715/205 |
| 5,644,623 | A | * | 7/1997 | Gulledge | 455/423 |
| 6,128,434 | A | * | 10/2000 | Hirayama et al. | 386/97 |
| 6,246,402 | B1 | * | 6/2001 | Setogawa et al. | 715/723 |

(Continued)

FOREIGN PATENT DOCUMENTS

CN 503663 9/2002
(Continued)

OTHER PUBLICATIONS

ISO 639, Wikipedia, the free encyclopedia, Print out from web archive: http://web.archive.org/web/20040820030007/en.wikipedia.org/wiki/ISO_639, Aug. 18, 2004, 22 pages.*

(Continued)

*Primary Examiner* — Phong Nguyen
(74) *Attorney, Agent, or Firm* — NSIP Law

(57) ABSTRACT

An information storage medium for storing metadata supporting multiple languages and a method of processing the metadata are provided. The information storage medium is provided to store contents, and at least one metadata file in which information regarding the contents is recorded in at least one language. The metadata file comprises a plurality of language files in which a plurality of versions of the information regarding the contents written in a plurality of languages are provided, and the languages are identified by the names of the respective language files. The names of the language files may include a language identifier according to an ISO 639-2 standard. The information may also include download information regarding a plurality of downloadable metadata files that are downloadable from other storage media.

2 Claims, 5 Drawing Sheets

U.S. PATENT DOCUMENTS

| | | | |
|---|---|---|---|
| 6,697,566 B2 | 2/2004 | Fujinami et al. | |
| 7,007,012 B2 * | 2/2006 | Morita et al. | 707/999.003 |
| 7,376,338 B2 * | 5/2008 | Kim et al. | 386/95 |
| 2002/0044757 A1 | 4/2002 | Kawamura et al. | |
| 2002/0069205 A1 * | 6/2002 | Morita et al. | 707/10 |
| 2002/0091511 A1 * | 7/2002 | Hellwig et al. | 704/201 |
| 2002/0188841 A1 | 12/2002 | Jones et al. | |
| 2003/0012558 A1 * | 1/2003 | Kim et al. | 386/97 |
| 2003/0081944 A1 | 5/2003 | Kim et al. | |
| 2003/0086693 A1 * | 5/2003 | Chung | 386/70 |
| 2003/0105834 A1 * | 6/2003 | Hoang | 709/219 |
| 2003/0115552 A1 * | 6/2003 | Jahnke et al. | 715/536 |
| 2003/0167209 A1 * | 9/2003 | Hsieh | 705/26 |
| 2003/0206712 A1 * | 11/2003 | Yoshio et al. | 386/46 |
| 2003/0206727 A1 * | 11/2003 | Sawabe et al. | 386/96 |
| 2004/0047589 A1 | 3/2004 | Kim | |
| 2004/0081434 A1 * | 4/2004 | Jung et al. | 386/95 |
| 2004/0141726 A1 * | 7/2004 | Fujinami et al. | 386/95 |
| 2004/0190405 A1 * | 9/2004 | Tsumagari et al. | 369/47.1 |
| 2004/0190879 A1 | 9/2004 | Saitou | |
| 2004/0208488 A1 * | 10/2004 | Fuchigami et al. | 386/96 |
| 2004/0216169 A1 * | 10/2004 | Fujiwara | 725/135 |
| 2004/0254981 A1 * | 12/2004 | Lee | 709/203 |
| 2005/0004933 A1 * | 1/2005 | Potter | 707/102 |
| 2005/0058435 A1 | 3/2005 | Chung et al. | |
| 2006/0004738 A1 | 1/2006 | Blackwell et al. | |
| 2006/0126451 A1 | 6/2006 | Shinkai et al. | |
| 2006/0212580 A1 * | 9/2006 | Wu | 709/227 |
| 2007/0172199 A1 * | 7/2007 | Kobayashi et al. | 386/95 |
| 2008/0109414 A1 * | 5/2008 | Chun et al. | 707/3 |
| 2008/0109449 A1 * | 5/2008 | Chun et al. | 707/10 |
| 2008/0109460 A1 * | 5/2008 | Chun et al. | 707/100 |
| 2008/0137729 A1 * | 6/2008 | Jung | 375/240.01 |

FOREIGN PATENT DOCUMENTS

| | | |
|---|---|---|
| JP | 2003-134440 A | 5/2003 |
| JP | 2003-219344 A | 7/2003 |
| JP | 2004-140449 | 5/2004 |
| JP | 2004-266577 | 9/2004 |
| JP | 2004-328653 | 11/2004 |
| KR | 2000-30409 | 6/2000 |
| KR | 2000-39748 | 7/2000 |
| KR | 2001-94616 | 11/2001 |
| KR | 2001-97802 | 11/2001 |
| KR | 2002-43937 | 6/2002 |
| KR | 10-0390659 | 6/2003 |
| KR | 2003-59991 | 7/2003 |
| KR | 2003-71243 | 9/2003 |
| KR | 2004-34403 | 4/2004 |
| RU | 2 228 546 | 5/2004 |
| WO | WO 03/047249 | 6/2003 |
| WO | WO 03/065248 | 8/2003 |
| WO | WO 2004/036574 | 4/2004 |

OTHER PUBLICATIONS

Filename, Wikipedia,the free encyclopedia,Print out from web archive: http://web.archive.org/web/20071031054452/en.wikipedia.org/wiki/Filename, Oct. 30, 2007, 9 pages.*
Filename, The Tech Terms Computer Dictionary,Print out from Internet: http://www.techterms.com/definition/filename, Oct. 19, 2007, 2 pages.*
Office Action issued in Chinese Patent Application No. 200580027794X on Aug. 1, 2008.
Office Action issued by Russian Patent Office in Russian Patent Application No. 2007105891/09(006398) on Oct. 16, 2008.
International Search Report issued Dec. 21, 2005 re: PCT International Application No. PCT/KR2005/002970.
Office Action Issued in Taiwanese Patent Application No. 094130836 on Oct. 13, 2006.
U.S. Appl. No. 11/214,801, filed Aug. 31, 2005, Hye-jeong Chun et al., Samsung Electronics Co., Ltd.
U.S. Appl. No. 11/967,322, filed Dec. 31, 2007, Hye-jeong Chun et al., Samsung Electronics Co., Ltd.
U.S. Appl. No. 11/967,323, filed Dec. 31, 2007, Hye-jeong Chun et al., Samsung Electronics Co., Ltd.
[MS-LCID]: Windows Language Code Identifier (LCID) Reference, v20100305, Mar. 5, 2010, Microsoft Corporation (45 pages).
Optical Storage Technology Association, "MPV Core Specification Revision 1.01," Mar. 11, 2003, pp. 1-133, URL: http://www.osta.org/mpv/public/specs/MPVCore-spec-1.01.pdf.
Optical Storage Technology Association, "XML Manifest Specification Revision 1.01," Mar. 11, 2003, pp. 1-23, URL: http://www.osta.org/mpv/public/specs/XML-manifest-spec-1.01.pdf.
European Search Report issued on May 12, 2010, in corresponding European Application No. 05808568.9 (8 pages).
Japanese Office Action issued on Jan. 18, 2011, in counterpart Japanese Application No. 2007-531074 (3 pages, in Japanese, no English translation).
Chinese Office Action issued on Jul. 4, 2011, in counterpart Chinese Application No. 200580027794.X (14 pages, in Chinese, including complete English translation).

* cited by examiner

INFORMATION STORAGE MEDIUM FOR STORING METADATA SUPPORTING MULTIPLE LANGUAGES, AND SYSTEMS AND METHODS OF PROCESSING METADATA

CROSS-REFERENCE TO RELATED APPLICATIONS

This application is a division of application Ser. No. 11/214,801 filed on Aug. 31, 2005, now pending, which claim the benefit of Korean Patent Application Nos. 2004-73925 filed on Sep. 15, 2004, and 2004-91910 filed on Nov. 11, 2004, in the Korean Intellectual Property Office, the disclosures of which are incorporated herein by reference.

BACKGROUND OF THE INVENTION

1. Field of the Invention

The present invention relates to metadata, and more particularly, to an information storage medium for storing metadata to support multiple languages, and systems and methods of processing the metadata.

2. Related Art

Information recording media, for example, digital versatile discs (DVDs), may store contents, such as audio/video (AV) data, and information regarding the contents, i.e., metadata. Examples of metadata include information regarding the title of a movie stored on a disc, information regarding the date of manufacture of the movie, information regarding actors and actresses who starred in the movie, and information regarding the director of the movie. Therefore, a user can easily search for contents with a desired title or contents in which a certain actor or actress starred with reference to metadata.

If metadata is provided in multiple languages, people from different countries can easily search for contents with reference to different versions of the metadata written in the multiple languages. In other words, a user can search for and browse metadata using a language, which he or she can understand. In addition, metadata written in a language other than those languages stored on an information recording medium can also be downloaded, via a network, or can be copied from another memory, for the user's convenience.

FIG. 1 is a block diagram illustrating an example format of subtitle data 100. Referring to FIG. 1, the subtitle data 100 includes text data 110, which is to be displayed as subtitles, synchronization information 120, which specifies when the text data 110 is to be displayed in synchronization with an AV stream, display region information 130, which specifies where the text data 110 is to be displayed, and display style information 140, which specifies the text data 110 is to be displayed in a specific display style. The display region information 130 may be represented as Region (l, t w, h) to indicate that the text data 110 is to be displayed in an area which has a width "w" and has a height "h" above a point (l, t). The display style information 140 includes font information, output direction information, and line space information regarding the text data 110 to be displayed in the same area.

FIG. 2 is a block diagram of an example reproduction apparatus 200 to reproduce subtitle data in synchronization with an AV stream. Referring to FIG. 2, the reproduction apparatus 200 reads subtitle data 100, as shown in FIG. 1, from an information storage medium 210, downloads subtitle data 100 from a server 220, via a network such as the Internet 230, and reproduces both of the subtitle data 100 in synchronization with an AV stream 240. Subtitle data 100 may be stored on the information storage medium in different units from an AV stream 240. In other words, the subtitle data 100, which is to be laid over an image generated by decoding the AV stream 240, may be recorded on the information storage medium separately from the AV stream. In order to provide a user with subtitle data 100 in multiple languages or various types of subtitle data 100, the reproduction apparatus 200 may also download subtitle data 100 from the server 220, via a network such as the Internet 230, and may reproduce the downloaded subtitle data in the same manner as the subtitle data obtained from the information storage medium 210.

As described above, subtitle data 100 read from an information storage medium, or subtitle data 100 downloaded from the server 220, via the Internet 230, as shown, for example, in FIG. 2, can be provided to a user. Metadata, like subtitle data, may be obtained from an information storage medium or from a remote server, via the Internet, as shown, for example, in FIG. 2, and provided to a user. In other words, metadata written in some languages may be recorded in an information storage medium, and metadata written in some other languages may be stored in a remote server, via the Internet, so that they can be downloaded from the information storage medium and the server, via the Internet. However, in conventional methods of expressing metadata that is downloaded via a network, a considerable amount of storage capacity may be wasted in an effort to store the metadata. In addition, in a metadata search, two words written in different languages can be determined to refer to different information even when they may have the same meaning.

Therefore, there is a need for providing metadata in a plurality of different languages that are accessible and updatable, even if memory resources are limited in a reproduction apparatus and/or an information storage medium, such that a user can easily search for contents in a desired language that can be understood. Also needed are techniques to enhance the metadata search, such that multiple words which share the same meaning but are written in different languages, are not mistaken as different metadata.

SUMMARY OF THE INVENTION

Various aspects of the present invention advantageously provide an information storage medium for storing metadata supporting multiple languages which can enable a user, via a reproduction apparatus, to browse metadata using a desired language and to search for desired contents with reference to the metadata, using the metadata stored therein or downloaded from other storage media in different languages, and a method of processing the metadata.

According to an aspect of the present invention, there is provided an information storage medium for storing metadata used to search for other information storage media. The information storage medium is provided with contents; and at least one metadata file in which information regarding the contents is recorded in at least one language. The metadata file comprises a plurality of language files in which a plurality of versions of the information regarding the contents written in a plurality of languages are stored, and the languages are identified by the names of the respective language files.

The names of the respective language files may include a language identifier according to an ISO 639-2 standard.

The information may also include download information regarding a plurality of downloadable metadata files that are downloadable from other storage media.

The download information may include server location information specifying a location of one or more servers in which the downloadable metadata files are respectively stored.

The download information includes: disc identification (ID) information identifying the information storage medium; language code information regarding a plurality of languages in which the downloadable metadata files are written; and server location information specifying a location of one or more servers in which the downloadable metadata files are stored.

According to another aspect of the present invention, there is provided an information storage medium for storing metadata used to search for other information storage media. The information storage medium includes: contents; and at least one metadata file in which information regarding the contents is recorded in at least one language. The metadata file comprises at least one representative metadata file in which portions of the information regarding the contents that are language-independent are recorded in a common language.

The metadata file may also include at least one language-dependent metadata file in which portions of the information regarding the contents that are language-dependent are written in one of a plurality of languages other than the common language.

The language-dependent metadata file may be downloadable, via a network.

According to another aspect of the present invention, there is provided an information storage medium storing metadata used to search for other information storage media. The information storage medium includes: contents; and a metadata file in which information regarding the contents is recorded in at least one language. The metadata file comprises at least one descriptor comprising a plurality of parameter sets which are a plurality of versions of the information regarding the contents written in a plurality of languages.

According to another aspect of the present invention, an apparatus for reproducing data from an information storage medium includes: a local storage unit which stores at least one metadata file in which information regarding contents stored in the information storage medium is recorded in at least one language; and a search unit which searches for a specified information storage medium that matches a specified condition with reference to the metadata file stored in the local storage unit. The metadata file comprises a plurality of language files in which a plurality of versions of the information regarding the contents written in a plurality of languages are stored, and the languages are identified by the names of the respective language files.

According to another aspect of the present invention, a method of reproducing data from an information storage medium includes: reading at least one metadata file in which information regarding contents stored in the information storage medium is recorded in at least one language; and searching for a specified information storage medium that matches a specified condition with reference to the read metadata file. The read metadata file comprises a plurality of language files in which a plurality of versions of the information regarding the contents written in a plurality of languages are stored, and the languages are identified by the names of the respective language files.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

The present invention is applicable for use with all types of memory or computer-readable media, recording and/or reproducing apparatuses, and computer systems implemented methods described according to various embodiments of the present invention.

In accordance with aspects of the present invention, metadata in multiple languages can be provided by three methods. In the first method, a plurality of versions of metadata written in a plurality of languages, other than a predetermined language of a metadata file stored on a disc, can be provided using a manifest file, which includes language code information regarding the languages in which the respective versions of metadata are written, and uniform resource locator (URL) information specifying the locations of one or more remote servers, via a network, where the respective versions of metadata in different languages are stored. As a result, a reproduction apparatus with limited memory resources can be advantageously utilized to provide metadata in multiple languages by using the manifest file which comprises the language code information, disc identification information identifying the disc, and the URL information.

In the second method, metadata can be classified as language-dependent portions and language-independent portions. Thereafter, representative metadata can then be formed using common metadata, which is comprised of language-independent portions of metadata, and identifiers (IDs) of languages in which language-dependent portions are written.

As a result, metadata in multiple languages can be advantageously provided with limited memory resources.

In the third method, metadata in multiple languages can be provided using a plurality of parameter sets written under each descriptor. Each descriptor may include a plurality of parameter sets written in different languages, such as, English, Chinese and Korean. As a result, specific words written in different languages to share the same meaning can be advantageously ascertained without confusion during a metadata search.

Therefore, according to aspects of the present invention, metadata can be easily updated, even if information recording media such as discs are released onto the market. In other words, addresses of a plurality of remote servers from which a plurality of versions of metadata other than the metadata version stored on a disc can be downloaded, may be stored in a manifest file stored on the disc (the first method) or in a common metadata file (the second method). Therefore, a user can determine which of the remote servers stores a desired version of metadata and can download the desired version of metadata based on the determination results. In the third method, metadata can be updated in units of descriptors.

The first through third methods mentioned above will now be described in detail with reference to FIGS. 3 through 8 herein below.

Figure 1:
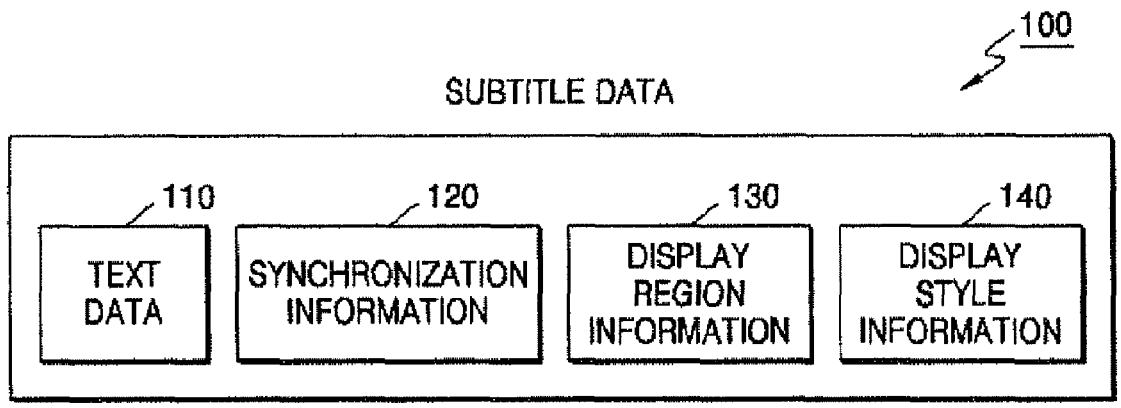
FIG. 1 is a block diagram illustrating an example format of subtitle data.
Figure 2:
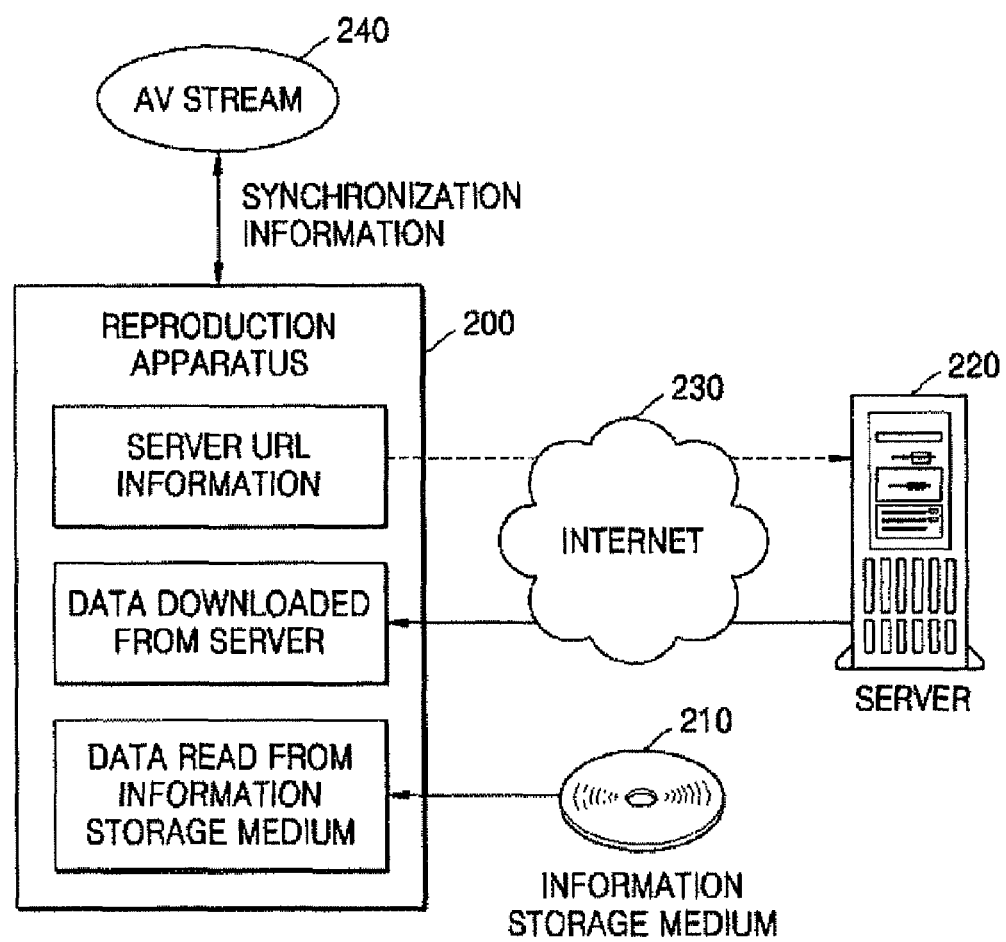
FIG. 2 is a block diagram of an example reproduction apparatus used to reproduce subtitle data in synchronization with an AV stream.
Figure 3:
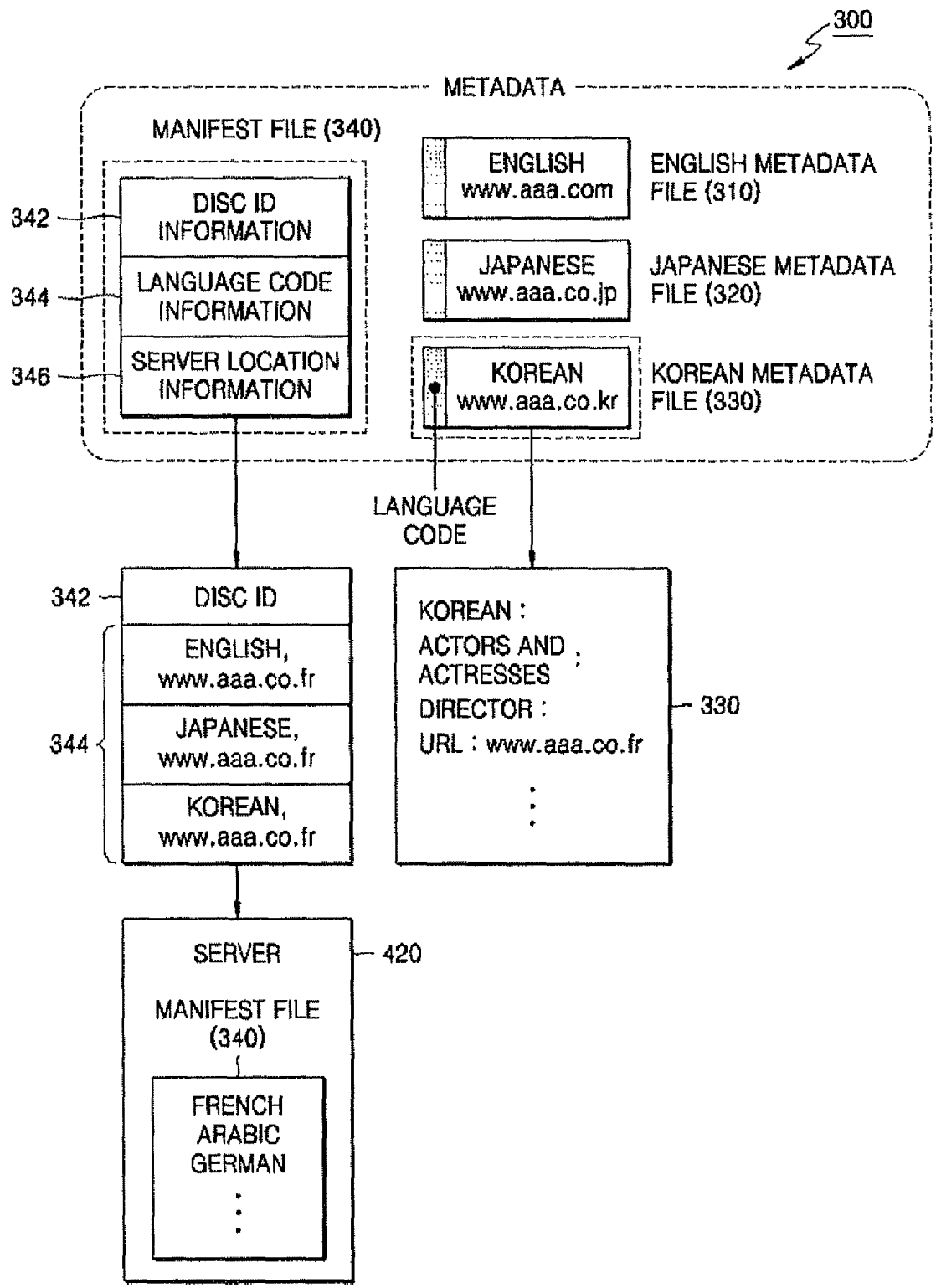
FIG. 3 is a diagram for explaining a method of providing metadata in multiple languages using a manifest file according to an embodiment of the present invention.

FIG. 3 is a diagram for explaining a method of providing metadata 300 in multiple languages using a manifest file according to an example embodiment of the present invention. Referring to FIG. 3, a plurality of versions of metadata written in a plurality of languages are stored as separate metadata files, e.g., an English metadata file 310, a Japanese metadata file 320, and a Korean metadata file 330. Server location information regarding a plurality of servers from which metadata in some other corresponding languages is stored in each of the respective metadata files 310, 320, 330. The location information of the servers may be uniform resource location (URL) information. The English metadata file 310, the Japanese metadata file 320, and the Korean metadata file 330 may have different URL information. Languages available are identified by the names of the respective language metadata files, such as English metadata file 310, Japanese metadata file 320, and Korean metadata file 330. The names used may include a language identifier according to an ISO 639-2 standard.

The manifest file 340 may include disc ID information 342 used to identify the information storage medium such as a disc, language code information 344 used to specify language codes corresponding to the metadata files 310, 320, 330, such as English, Japanese and Korean, and server location information 346 used to identify one or more remote servers from which metadata in some other languages can be downloaded, via a network.

Figure 4:
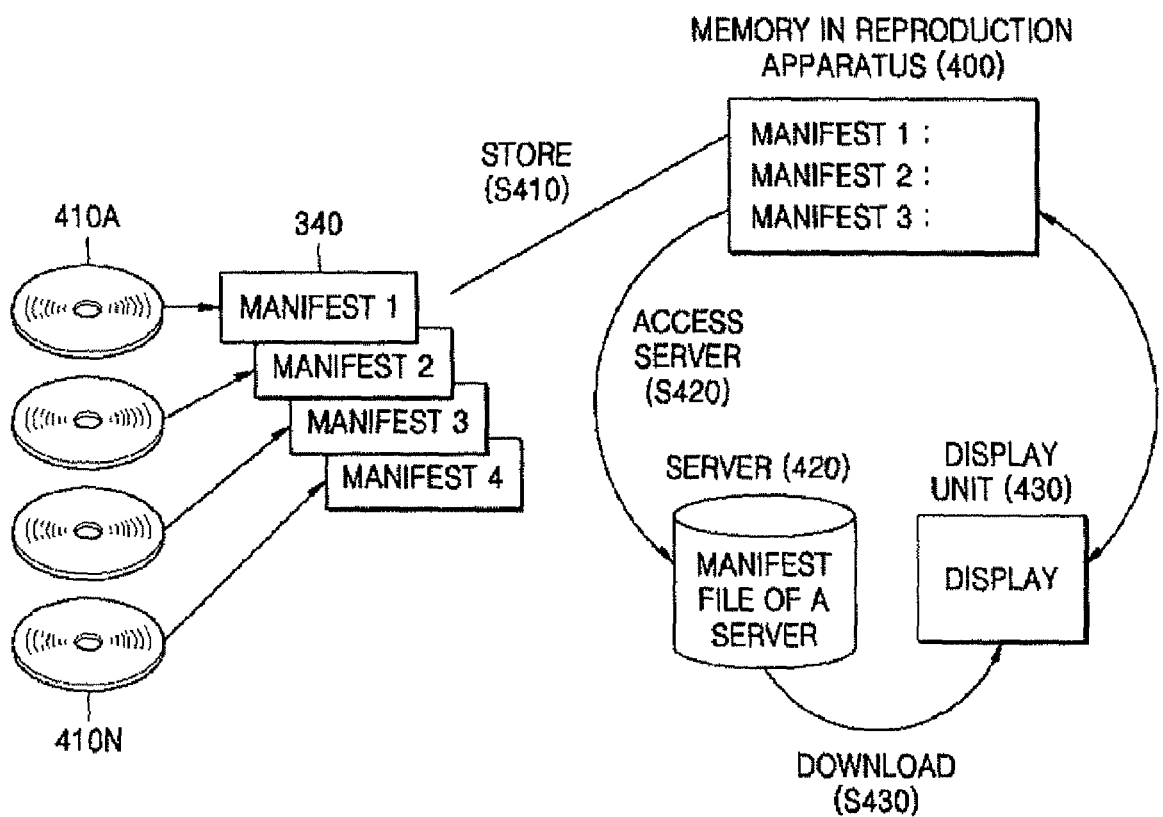
FIG. 4 is a diagram for explaining a method of displaying contents using a manifest file according to an embodiment of the present invention.

Accordingly, with reference to the manifest file 340, a user can examine a list of languages that can be supported by a disc and choose one of the listed languages, or download additionally a version of metadata written in a desired language from a server 420 (as will be shown in FIG. 4). For example, if the user wishes to download a French version of the metadata, the user may examine the manifest file 340 storing a URL of a server 420 in which the French metadata version is stored. Thereafter, the user accesses the server 420 by clicking the URL of the server 420 and then downloads the French metadata version from the server 420. A manifest file 340 may be formed to have a size of 512 bytes for information regarding each language, and includes disc ID information 342, language code information 344 and server location information 346, as shown, for example, in FIG. 3. Thus, assuming that up to 32 versions of metadata written in 32 languages can be provided by a digital versatile disc (DVD), a manifest file 340 may be formed to have a size of about 16 Kbytes (=32×512 bytes), in which case, a maximum storage capacity required for storing 1000 manifest files is about 16 Mbytes. In other words, an information storage medium may be required to store only a small number of metadata files for a few languages and server location information for other metadata files for other languages, so as to minimize memory resources used.

Therefore, even when a reproduction apparatus has insufficient memory resources, it can still provide a plurality of versions of metadata written in a plurality of languages with reference to a manifest file 340 which includes disc ID information identifying the disc, language code information regarding the plurality of languages available, and server location information specifying where the plurality of versions of the metadata can be found, without the need to store the plurality of versions of the metadata therein. Since many versions of metadata in different languages can be stored in one or more remote servers, or other storage media, and can be accessible at the user's convenience, memory resources allocated for metadata in an information storage medium can be advantageously minimized.

Turning now to FIG. 4, a flow diagram to explain a method of displaying contents using a manifest file according to an embodiment of the present invention is illustrated. Referring to FIG. 4, in operation S410, when an information storage medium such as a disc 410 is inserted into a reproduction apparatus 400, a manifest file 340 of the disc 410 is stored in a memory of the reproduction apparatus 400. The manifest file 340 includes disc ID information 342 for identifying the disc, language code information 344 for specifying the languages supported by the disc, and server location information 346 for identifying the location of at least a server 420, as shown in FIG. 3. In operation S420, a URL of a server 420, in which a desired version of metadata written in a desired language is stored, is accessed with reference to the server location information 346 included in the manifest file 340. In operation S430, the desired metadata version is downloaded from the server 420 in operation S420, and the downloaded contents are displayed on a display unit 430.

Figure 5:
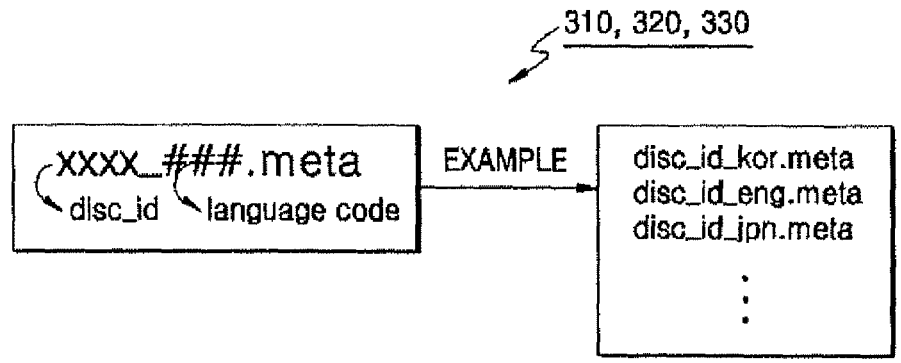
FIG. 5 is a diagram for explaining a method of naming each of a plurality of metadata written in different languages.

FIG. 5 is a diagram to explain a method of naming each of a plurality of metadata files written in different languages, such as English metadata file 310, Japanese metadata file 320, and Korean metadata file 330, as shown in FIG. 3. Referring to FIG. 5, if a metadata file is named to specify (1) a disc ID that it belongs to, and (2) a language code that it supports, then the disc ID information and the language code information can be easily obtained from the name of the metadata file. For example, as shown in FIG. 5, a metadata file can be named as "disc_id_kor.meta" which is used to identify not only the disc ID but also the Korean language in which the metadata is written. Similarly, the metadata file can also be named as "disc_id_eng.meta" which is used to identify not only the disc ID but also the English language in which the metadata is written. Likewise, the metadata file can also be named as "disc_id_jpn.meta" which is used to identify not only the disc ID but also the Japanese language in which the metadata is written. Thus, only server location information, e.g., URL information, is needed to be included in the manifest file 340. In other words, the manifest file 340 may only need to include server location information, and not the disc ID information and the language code information. Therefore, the size of the manifest file 340 may be about 8 Kbytes (=256 bytes×32), in which case, a maximum storage capacity required for storing 1000 manifest files 340 is about 8 Mbytes. As a result, a small memory device such as a flash memory can be utilized instead of a hard disc. Thus, a reproduction apparatus 400 having a small storage capacity, e.g., a reproduction apparatus having a flash memory instead of a hard disc, can still provide metadata in multiple languages.

Figure 6:
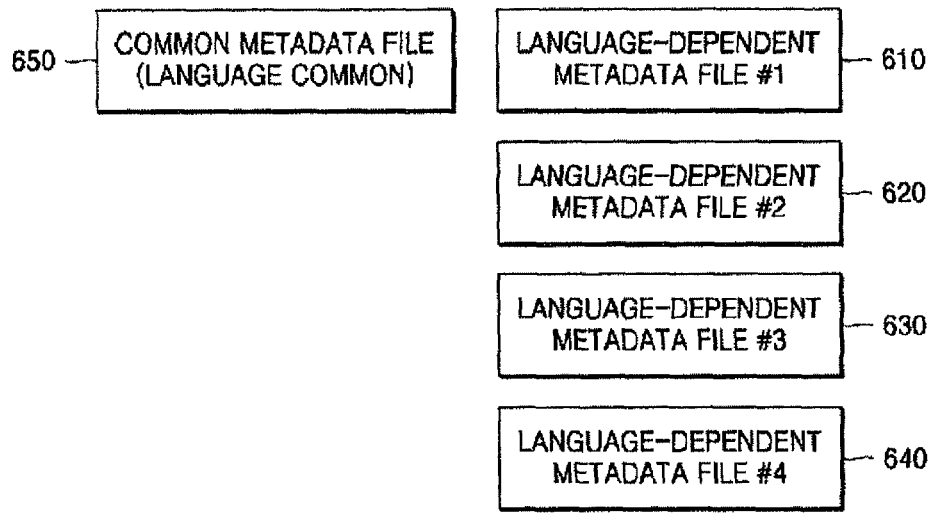
FIG. 6 is a block diagram for explaining a method of providing metadata in multiple languages using representative metadata in which language-independent portions of the metadata that can be written in a common language are set as the representative metadata according to an embodiment of the present invention.

FIG. 6 is a block diagram to explain a method of providing metadata in multiple languages using representative metadata in which language-independent portions of metadata that can be written in a common language are set as the representative metadata according to an example embodiment of the present invention. Referring to FIG. 6, metadata can be classified into language-dependent portions and language-independent portions. For example, language-dependent portions of metadata, such as the names of actors or actresses, a disc name, and a contents manufacturer's name, are those which can be input by a content provider in different languages and are thus stored as separate metadata files, i.e., first through fourth language-dependent metadata files 610 through 640. On the other hand, language-independent portions of metadata are thus stored as a common metadata file 650. Language-independent portions included in the common metadata file 650 may contain contents running time, an audio file type and spatial resolution that are provided by the disc 410, which are expressed the same regardless of languages, and genre information, which is selected from a list and can be mechanically translated by a reproduction apparatus 400, as shown in FIG. 4.

The common metadata file 650 includes common data that can be reproduced regardless of the language of the contents being reproduced from any one of the language-dependent metadata files 610, 620, 630, 640 on the disc 410. Thus, the common metadata file 650 can be designated as a representative metadata file. Language code information regarding the first through fourth language-dependent metadata files 610 through 640 can also be included in the common metadata file 650. Language-dependent portions of metadata for another language (not available from the first through fourth language-dependent metadata files 610 through 640) may be downloaded additionally from other storage media, or remote servers, via a network, so that the additional language can be supported.

Figure 7A:
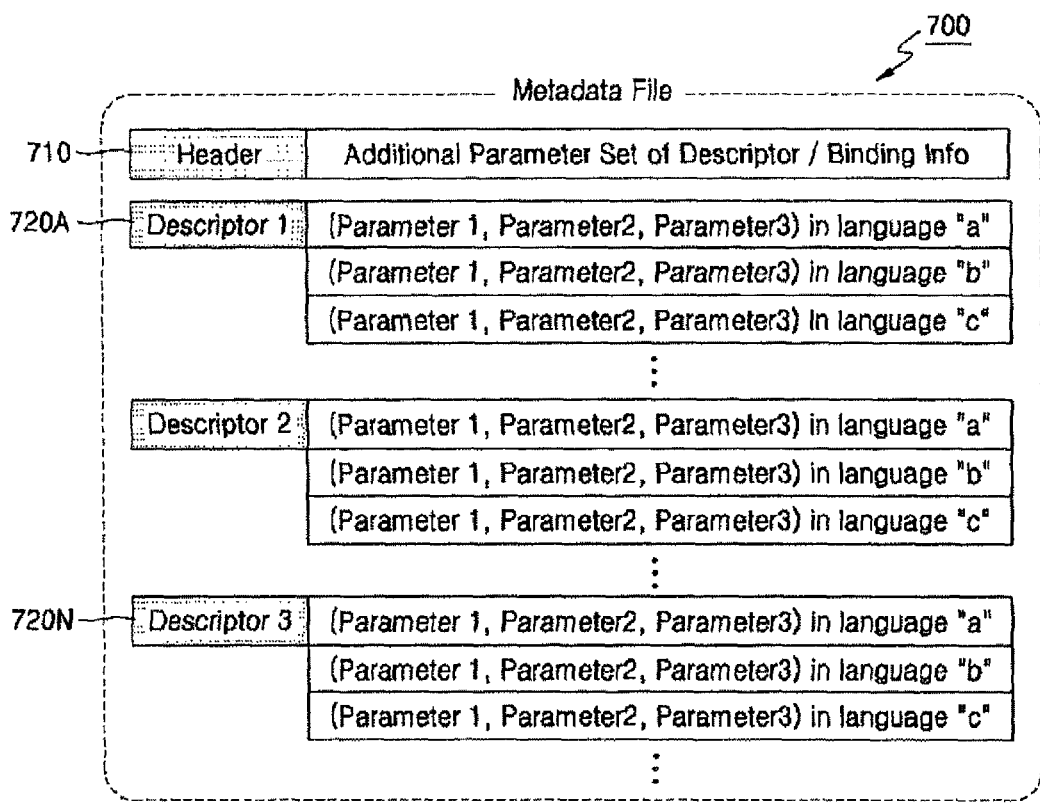
FIGS. 7A and 7B are diagrams for explaining a method of providing metadata in multiple languages using a plurality of parameter sets related to a descriptor according to an embodiment of the present invention.
Figure 7B:
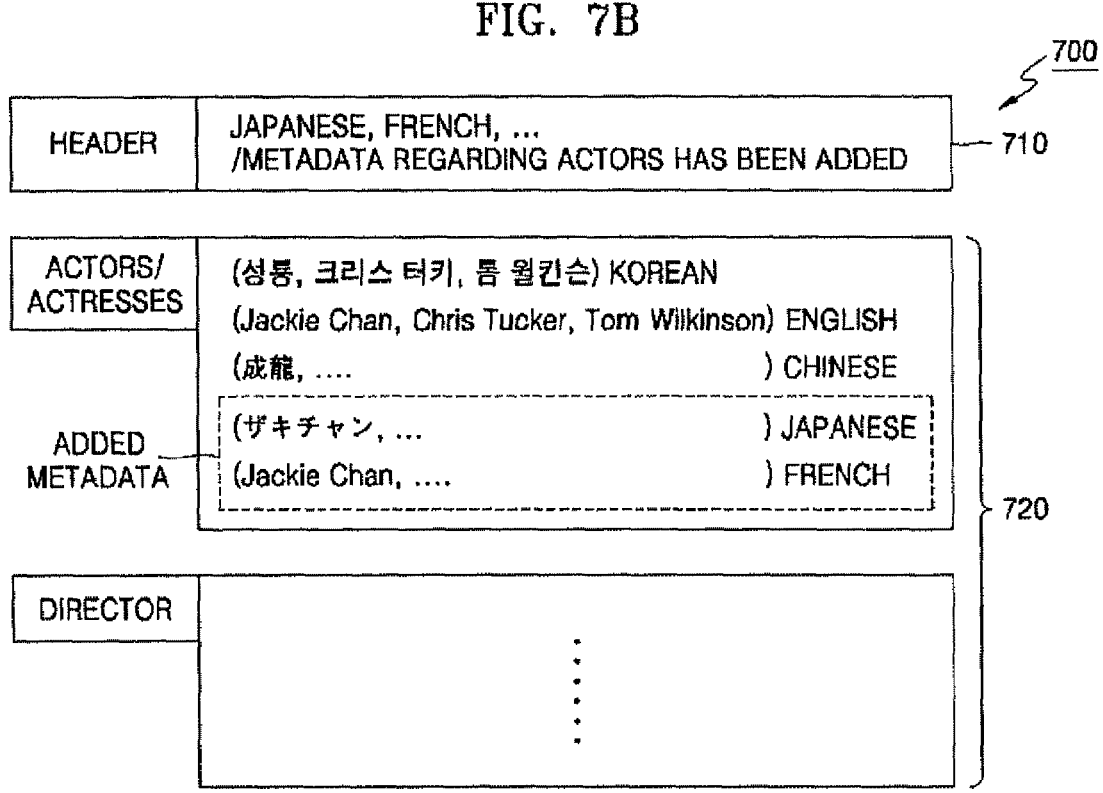

FIGS. 7A and 7B are diagrams to explain a method of providing metadata in multiple languages using a plurality of parameter sets under a descriptor according to an example embodiment of the present invention. Referring to FIGS. 7A and 7B, metadata can be represented in the form of a metadata file 700 which includes a header 710 and a plurality of descriptors 720A-720N with each descriptor including a plurality of parameter sets written in multiple languages. As a result, a plurality of parameter sets per descriptor are generated in a plurality of languages supported by an information storage medium such as a disc 410, instead of storing a plurality of versions of metadata written in the plurality of languages as separate metadata files. For example, a descriptor "actors/actresses" may include a Korean parameter set comprising the names of a plurality of actors, e.g., Jackie Chan, Chris Tucker, Tom Wilkinson, and Tzi Ma, written in Korean, an English parameter set comprising the names of the actors written in English, and a Chinese parameter set comprising the names of the actors written in Chinese. A plurality of descriptors 720A-720N each comprising a plurality of parameter sets written in a plurality of languages may constitute a single metadata file 700 that is available at an information storage medium such as a disc 410, shown in FIG. 4. A parameter set written in other than the plurality of languages can also be additionally downloaded from a remote server 420, via a network, as shown in FIG. 4. In this manner, a metadata file 700 can be updated in units of descriptors. When a metadata file 700 is updated, update information may be stored in a header 710 of the metadata file 700. For example, referring to FIG. 7A, if a Japanese parameter set and a French parameter set are added to the descriptor "actors/actresses", information about the added languages may be recorded in a header 710 of the metadata file 700.

In the method illustrated in FIGS. 7A and 7B, it is easy to determine whether a plurality of parameter sets written in a plurality of languages refer to the same thing. For example, in the method as illustrated in FIGS. 7A and 7B, the name of the actor Jackie Chan written in different languages, e.g., English, Chinese, and Korean, may be classified as belonging to different parameter sets under one descriptor, thereby making it easy to determine whether the names of the actor written in different languages refer to the same person. As a result, it is possible to reduce the probability of a plurality of versions of metadata written in a plurality of languages being determined as being different metadata.

In summary, according to the methods illustrated in FIGS. 3, 6, and 7A and 7B, it is also possible to easily update metadata. In other words, according to the methods illustrated in FIGS. 3, 6, and 7A and 7B, it is possible to easily update metadata by several ways: (1) downloading a plurality of metadata files for a plurality of languages from the respective servers, as described in connection with FIG. 3; (2) downloading a plurality of language-dependent metadata files from the respective servers, as described in connection with FIG. 6; or alternatively, (3) downloading a plurality of parameter sets under a descriptor written in a plurality of languages from the respective servers, as described in connection with FIGS. 7A-7B. In the case of updating metadata, disc ID information may be used to identify a disc, and additional ID information or URL information may be used to manage version information of metadata that can be updated.

Figure 8:
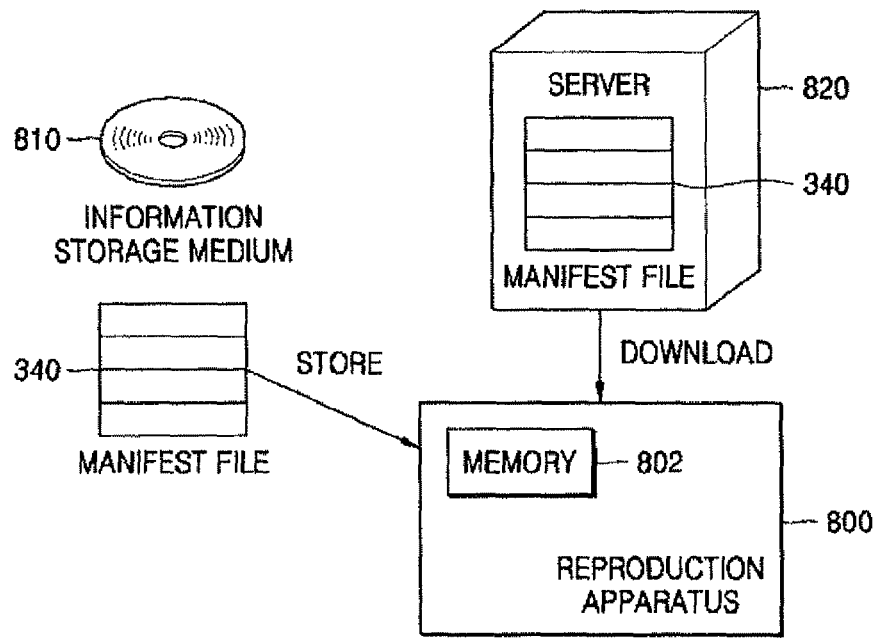
FIG. 8 is a system diagram for explaining a method of updating metadata using a manifest file obtained from an information storage medium and a remote server according to an embodiment of the present invention.

FIG. 8 is a system diagram for updating metadata using a manifest file stored on an information storage medium and a server according to an embodiment of the present invention. Referring to FIG. 8, the system includes a reproduction apparatus 800, an information storage medium 810, and a remote server 820. The reproduction apparatus 800 is provided with a memory (i.e., local storage unit) 802 and search mechanisms (not shown) to enable a user to search for contents with reference to metadata. The manifest file 340 stored on the information storage medium 810, e.g., a disc, includes URL information regarding a plurality of servers that are accessible, via a network, and the manifest file 340 stored in a server 820 includes a list of languages that can be supported. Thus, it is possible to choose and download metadata written in one of the listed languages from the server 820. For example, if a user already has an English version of metadata stored on the information storage medium 810, and wishes to download another version of the metadata written in a language other than English (e.g., Japanese or Korean) that is stored elsewhere, the user may examine a list of sites which are established in a plurality of languages other than English and from which a plurality of versions of the metadata written in the plurality of languages other than English can be downloaded using the manifest file 340 stored in the server 820. Then, the user can download a metadata file 340 by choosing and downloading any of the plurality of versions of the metadata written in the plurality of languages other than English. Similarly, metadata that is classified as language-dependent and language-independent portions as described in connection with FIG. 6, and metadata file including descriptors as described in connection with FIGS. 7A-7B, can also be updated in the same manner described in FIG. 8.

As described in the present invention, only a list of languages that can be provided by a reproduction apparatus is provided, and metadata written in a desired language can be downloaded from a server where it is stored with reference to the stored language list. Thus, it is possible for a reproduction apparatus even with limited memory resources to provide metadata in more than one language to a user. This is done by simply downloading the metadata from a server. In addition, in a metadata search, it is now possible to easily determine whether a plurality of metadata written in different languages are identical to one another in terms of what they refer to by using a plurality of parameter sets under descriptors written in different languages.

Various embodiments of the present invention used to process metadata can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, DVDs, etc.). The computer readable recording medium can also be distributed over network coupled computer systems so that the computer readable code is stored and executed in a distributed fashion. In addition, functional programs, codes and code segments for embodying the present invention may be easily deducted by programmers in the art which the present invention belongs to.

While there have been illustrated and described what are considered to be example embodiments of the present invention, it will be understood by those skilled in the art that various changes in form and modification may be made therein, and equivalents may be substituted for elements thereof without departing from the spirit and scope of the present invention. For example, other computer readable media such as read-only memory (ROM), random-access memory (RAM), CD-ROMs, magnetic tapes, floppy disks, and optical or data storage devices, may also be utilized as long as the metadata processing techniques as described in connection with FIG. 3, FIG. 4, FIG. 5, FIG. 6 FIGS. 7A-7B, and FIG. 8 are utilized. Likewise, a central controller can be implemented as a chipset, or alternatively, a general or special purposed computer programmed to perform the methods as described with reference to FIG. 3, FIG. 6 and FIGS. 7A-7B. Accordingly, it is intended, there that present invention not be limited to the various example embodiments disclosed, but that the present invention includes all embodiments falling within the scope of the appended claims.

What is claimed is:

1. An information storage medium storing program codes for reproducing data by performing a method comprising following steps:

reading, from the information storage medium:

contents comprising audio/visual (AV) data; and at least one metadata file in which information regarding the contents is recorded in at least one language, the information regarding the contents being for searching for the contents; and reproducing the contents with reference to the at least one metadata file;

wherein the metadata file comprises a plurality of language files in which different versions of the information regarding the contents written in different languages are provided;

the different languages are identified by names of the respective language files;

the names of the respective language files comprise a language identifier according to an ISO 639-2 standard;

the information regarding the contents further comprises download information regarding a plurality of downloadable metadata files that are downloadable from other storage media; and the download information comprises:

disc identification (ID) information identifying the information storage medium;

language code information regarding different languages in which the downloadable metadata files are written; and server location information specifying a location of one or more servers in which the downloadable metadata files are stored.

2. An apparatus, having a processor coupled to a memory, for reproducing data from an information storage medium, the apparatus comprising:

a reading unit to read, from the information storage medium:

contents; and at least one metadata file in which information regarding the contents is recorded; and a controller to reproduce the contents with reference to the at least one metadata file;

wherein the metadata file comprises a plurality of language files in which different versions of the information regarding the contents written in different languages are provided;

the different languages are identified by names of the respective language files;

the names of the respective language files comprise a language identifier according to an ISO 639-2 standard;

the information regarding the contents further comprises download information regarding a plurality of downloadable metadata files that are downloadable from other storage media; and the download information comprises:

disc identification (ID) information identifying the information storage medium;

language code information regarding different languages in which the downloadable metadata files are written; and server location information specifying a location of one or more servers in which the downloadable metadata files are stored.

* * * * *